United States Patent [19]
Cummings

[11] Patent Number: 6,135,057
[45] Date of Patent: Oct. 24, 2000

[54] TOP ENTRY FELINE LITTER BOX

[75] Inventor: Bruce D. Cummings, 13044 Northrup Trail, Eden Prairie, Minn. 55347

[73] Assignee: Bruce D. Cummings, Eden Prairie, Minn.

[21] Appl. No.: 09/304,744

[22] Filed: May 4, 1999

Related U.S. Application Data

[60] Provisional application No. 60/084,480, May 6, 1998.

[51] Int. Cl.⁷ .................................................. A01K 29/00
[52] U.S. Cl. ........................... 119/165; 119/166; 119/170
[58] Field of Search ..................................... 119/165, 166, 119/167, 168, 169, 170; D30/161

[56] References Cited

U.S. PATENT DOCUMENTS

| | | |
|---|---|---|
| D. 361,175 | 8/1995 | VanSkiver . |
| 2,306,014 | 12/1942 | Carson . |
| 3,618,568 | 11/1971 | Breeden ................................... 119/482 |
| 3,817,213 | 6/1974 | Chalmers ................................ 119/161 |
| 3,885,523 | 5/1975 | Coleman . |
| 4,352,340 | 10/1982 | Strubelt . |
| 4,869,204 | 9/1989 | Yananton . |
| 5,158,042 | 10/1992 | Hammerslag et al. . |
| 5,195,464 | 3/1993 | Mutter ..................................... 119/165 |
| 5,211,133 | 5/1993 | Foley . |
| 5,572,950 | 11/1996 | O'Rourke et al. . |
| 5,676,090 | 10/1997 | Cannady, Jr. . |
| 5,755,182 | 5/1998 | Brown, Jr. et al. ..................... 119/166 |
| 5,794,566 | 8/1998 | Goetz et al. . |

*Primary Examiner*—Peter M. Poon
*Assistant Examiner*—Yvonne R. Abbott
*Attorney, Agent, or Firm*—Vidas, Arrett & Steinkraus, P.A.

[57] ABSTRACT

The feline litter box in general has a base and a snap-on lid or top which is substantially flat. The snap-on lid or top has a recessed opening therethrough to provide access within the litter box. The interior of the lid proximate an edge may include an odor-reducing filter which preferably includes odor-absorbing material. On the exterior of the lid between the opening and the filter is located a paw-cleaning section which may be comprised of raised tabs, nubs, and/or brushes at the preference of an individual. A removable, disposable liner may be provided within the interior of the base to facilitate disposal of used litter.

14 Claims, 3 Drawing Sheets

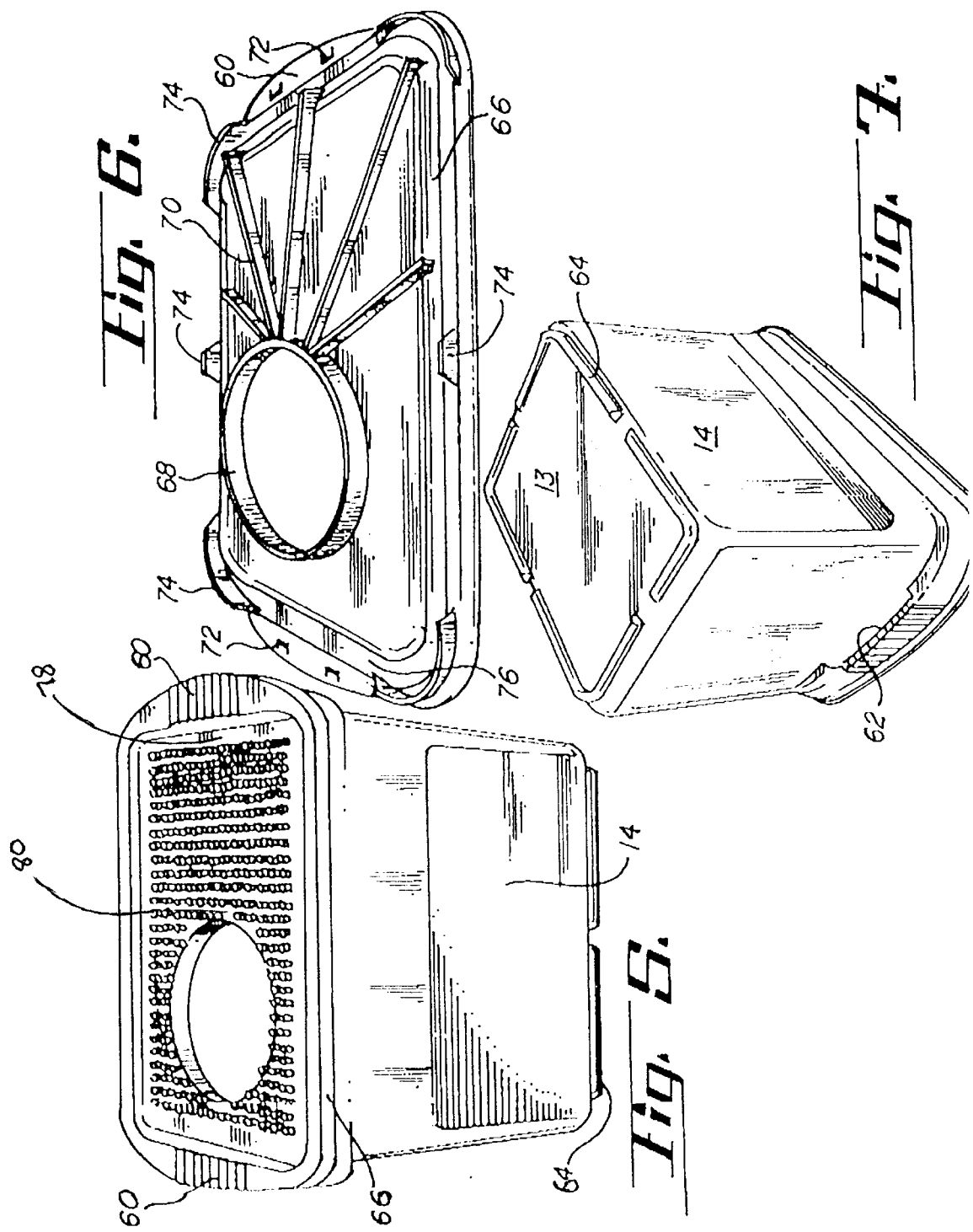

TOP ENTRY FELINE LITTER BOX

This application is filed as a utility patent application based upon provisional patent application serial no. 60/084,480, filed May 6, 1998, for TOP ENTRY FELINE LITTER BOX.

BACKGROUND

Feline litter boxes have been known in the past. A problem with the feline litter boxes as known is the resulting mess proximate to the exterior of the litter box. This mess usually occurs as a result of a feline exiting the litter box to spill litter which has not been removed from the area between the pads or on the feline's paws or feet. Additionally, a cat using a litter box frequently digs or moves litter within the box which may be expelled from the interior of the box to the floor area adjacent to the box. No top entry feline litter box is known which assists in cleaning of a feline's paws to attempt to maintain litter within the litter box. In addition, no top entry feline litter box is known which has a base side wall having a sufficient height dimension to prevent litter from being expelled onto a floor surface.

Another problem with the litter boxes as known is a problem associated with male cats urinating on the interior walls of a litter box during use. In may instances, the height dimension of the side walls of the litter box are insufficient to keep urine within the interior of a box and off of a floor surface. In addition, in many instances felines may have straddled the base of a litter box during use which has resulted in excrement to the exterior of the box on a floor surface. No litter box is known which has base side walls having sufficient height dimensions to maintain urine or excrement within the interior of the litter box. In addition, no top entry litter box is known having a seamless side wall further having a sufficient height dimension to eliminate the inadvertent leakage of urine to the exterior of the litter box.

No litter boxes are known which include a lid or top having an opening to assist in restricting access into the litter box by a feline or other pet, which assists in the retention of excrement and cat litter exclusively within the box. Further, no litter boxes are known which include a flat top having a paw-cleaning section which assists in the removal of litter from a feline's paws following the use of the box which thereby minimizes undesirable spillage of litter onto a floor surface proximate to a litter box. In addition, no litter box is known which deters dogs or other small pets from access into a cat litter box, which in turn, eliminates undesirable spillage of the contents of the litter box by the dog or other small pet.

These and other drawbacks of the litter boxes as known are overcome by the disclosed feline litter box herein.

SUMMARY OF THE INVENTION

A new feline litter box is disclosed herein. The feline litter box in general has a base and a snap-on lid or top which is substantially flat. The snap-on lid or top has a recessed opening therethrough to provide access within the litter box. The interior of the lid proximate to an edge may include an odor-reducing filter which preferably includes odor-absorbing material. On the exterior of the lid between the opening and the filter is located a paw-cleaning section which may be comprised of raised tabs, nubs, and/or brushes at the preference of an individual. A removable, disposable liner may be provided within the interior of the base to facilitate disposal of used litter.

It is a principal object of the present invention to provide a feline litter box of relatively simple and inexpensive design, construction, and operation which is safe and which fulfills the intended purpose of eliminating spillage of feline excrement from a litter box; eliminates urine from leaking to the exterior of the litter box; or the spillage of litter onto a floor surface, without fear of injury to a feline and/or damage to property.

Another principal object of the present invention is the provision of a feline litter box which has side walls having a sufficient height dimension to eliminate undesirable spillage of materials or fluids to the exterior of the litter box.

Still another principal object of the present invention is the provision of a feline litter box which simultaneously restricts dogs and small pets from entering a litter box and which provides access to the litter box by a feline vertically through an opening in the lid or top.

Still another principal object of the present invention is the provision of a feline litter box which minimizes undesirable odors associated with the use of the litter box by a feline.

Still another principal object of the present invention is the provision of a feline litter box having a paw, pad and/or foot cleaning area which minimizes undesirable spillage of cat litter to the exterior of the litter box.

Still another principal object of the present invention is the provision of a feline litter box having a disposable and removable liner which facilitates the disposal of used litter.

Still another principal object of the present invention is the provision of a feline litter box having improved odor absorption to minimize undesirable odors in a room.

Still another principal object of the present invention is the provision of a feline litter box having a top entry door to assist in the retention of undesirable odors in the interior of the litter box.

Still another principal object of the present invention is the provision of a feline litter box having a top entry door enabling ingress and egress of a feline into and from the interior of a litter box.

A feature of the present invention is the provision of a base having side walls having a sufficient height dimension to eliminate spillage of waste or litter material to the exterior of the feline litter box.

Another feature of the present invention is the provision of a base having a disposable and removable liner which attaches at the top of the side walls by extension over the lip of the side walls, which facilitates disposal of used litter which in turn eliminates undesirable touching or handling by an individual.

Still another feature of the present invention is the provision of a snap-on lid or top which is substantially flat for releasable affixation to the top of the side walls of the base.

Still another feature of the present invention is the provision of a lid or top having an entry opening having a dish-shaped or sloped ledge which facilitates the retention of litter within the interior of the feline litter box.

Still another feature of the present invention is the provision of a base having side walls of sufficient height as used in conjunction with a lid having an opening which eliminates the leaking of urine between the base and lid or hood and to the exterior of the feline litter box.

Still another feature of the present invention is the provision of a lid or top having a paw-cleaning section which may be comprised of a pattern of regularly spaced nubs, tabs, bristles, or portions of brush material for removal of litter from a feline's paws following use to minimize spillage onto a floor surface.

Still another feature of the present invention is the provision of a lid having a filter section which includes an odor-absorbing material to minimize unpleasant odors associated with the use of the feline litter box.

Still another feature of the present invention is the provision of a lid having an entry door mounted proximate to a top to assist in the retention of undesirable odors in the interior of the litter box.

Still another feature of the present invention is a lid having an entry door which either depends to the interior or extends to the exterior of the litter box during ingress or egress into or from the interior of the litter box during use by a cat.

Still another feature of the present invention is the provision of an entry door mounted to a spring which returns the entry door to a closed position relative to the lid.

Still another feature of the present invention is the provision of an entry door having a catch section designed to releasably engage a lip to position the entry door in a closed position relative to a lid for a litter box.

BRIEF DESCRIPTION OF THE DRAWINGS

FIG. 5 is an alternative environmental view of the feline litter box;

FIG. 6 is a detailed environmental view of the underside of the lid; and

FIG. 7 is an environmental view of the base.

DETAILED DESCRIPTION OF THE PREFERRED EMBODIMENT

Figure 1:
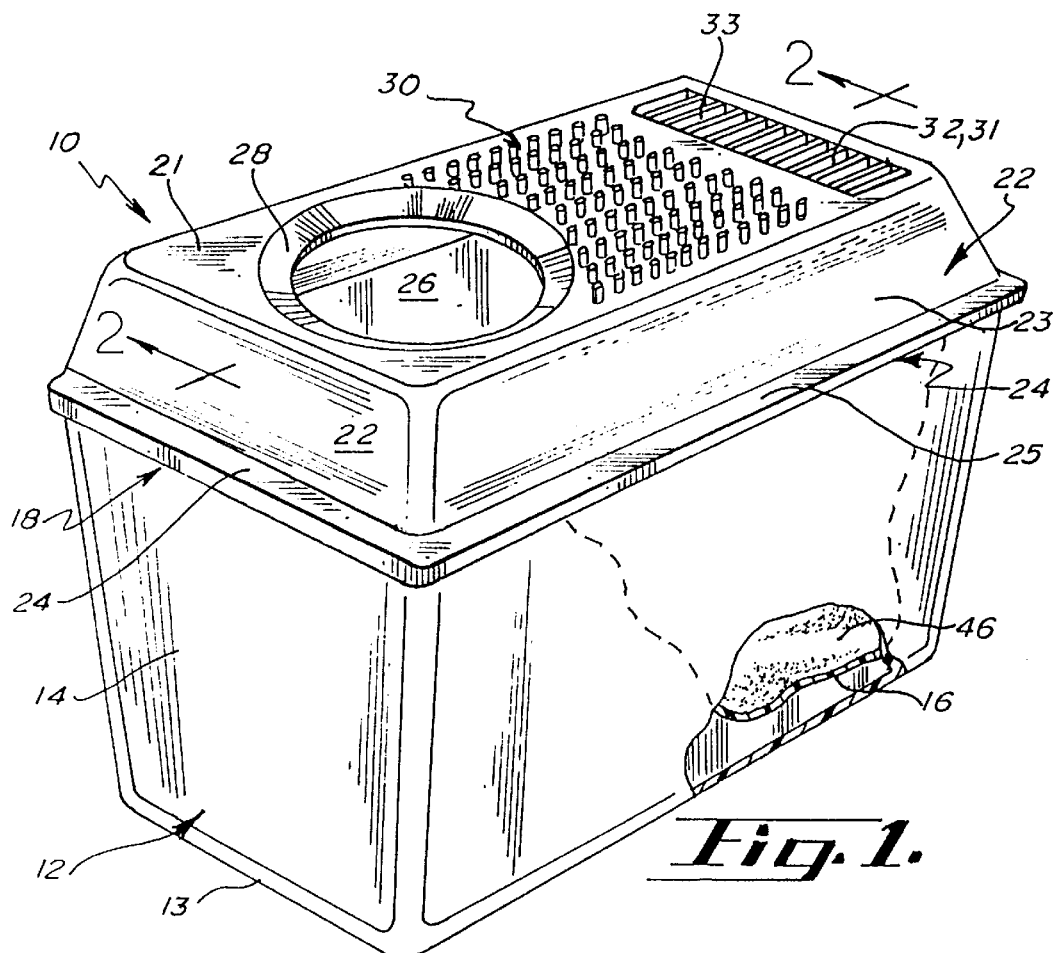
FIG. 1 is an isometric view of the feline litter box.

The feline litter box is illustrated and described herein. In general, the feline litter box is indicated by the numeral 10.

The feline litter box 10 preferably includes a base 12 and side walls 14. The side walls 14 are preferably elongate and extend upwardly from the base 12. The side walls 14 may be rectangular in shape. It should be noted that the shape selected for the base 12 and/or side walls 14 may vary considerably at the discretion of an individual and may be oval, circular, square, and/or rectangular. The base 12 preferably includes a bottom 13 and may include rounded corners at the preference of an individual. In addition the junction between adjacent side walls 14 may be rounded at the preference of an individual. The positioning of the side walls 14 relative to the base 12 and bottom 13 defines an interior for the feline litter box 10.

In the preferred embodiment, the base 12 is preferably formed of plastic material and is substantially rectangular in shape having length dimensions of approximately 24 inches, width dimensions of approximately 18 inches, and a height dimension of approximately 18 inches. The side walls 14 of the base 12 preferably have a sufficient height dimension to avoid the leaking or spraying of urine outside of the side walls 14 and onto a floor surface adjacent to the feline litter box 10.

The side walls 14 also preferably have a sufficient height dimension to eliminate the expulsion of litter or absorbent material 46 over the top of the side walls 14 and onto a floor surface adjacent to a feline litter box 10 during use by a cat.

Figure 3:
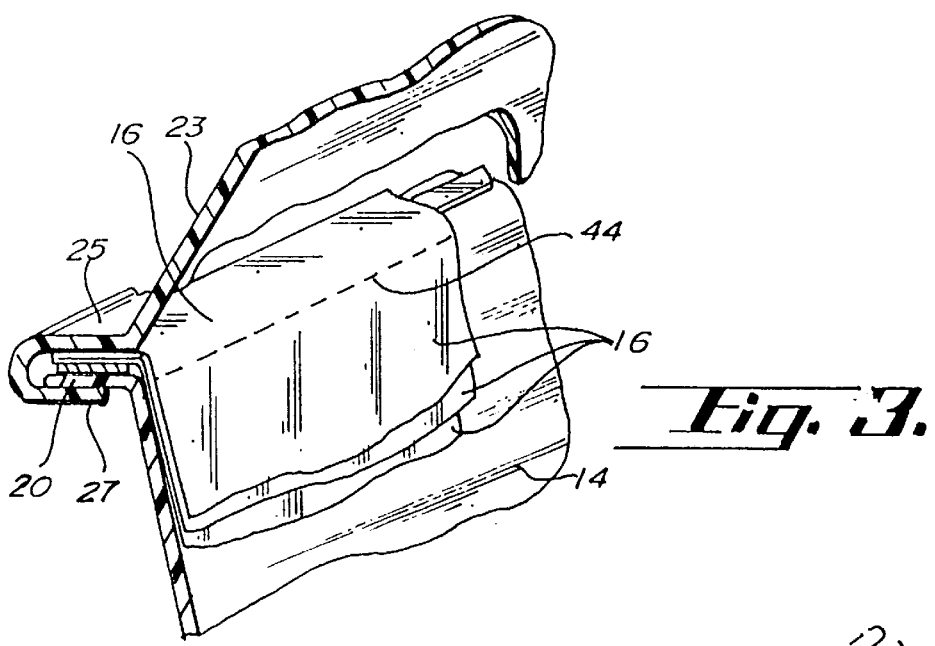
FIG. 3 is a detailed partial cut-away environmental view of the lip or affixation member for the feline litter box.

The feline litter box 10 may include a disposable liner 16 which may be utilized to facilitate cleaning by an individual. The disposable liner 16 may be releasably engaged to the interior of the side walls 14 by any preferred means including the use of adhesives, tape, snaps, clips, and/or snaps. Alternatively, the liner 16 may stretch or be positioned over the upper section 18 and/or lip 20 of the side walls 14 and be affixed thereto by the coupling of the lid 22 to the side walls 14. The disposable liner 16 may be formed of a packet of tear-away liners 16 having a perforated top edge 44 (FIG. 3). The bottom of the liner 16 preferably holds litter 46 which may be placed in the litter box 10 or which may be pre-packaged at the discretion of an individual. In this embodiment, an individual may separate adjacent liners 16 along the perforated top edge 44 for lifting a liner 16 and used litter 46 for disposal. The removal of the used liner 16 and litter 46 from the bottom of the feline litter box 10 then exposes a fresh liner 16 and litter 46 for use by a cat. Alternatively, an individual may separate the lid 22 from the lip 20 of the upper section 18 of the side walls 14 to release the liner 16 from affixation to the feline litter box 10. An individual may then either remove a used liner 16 for exposure of unused litter 46 or replace a liner 16 for filling with litter 46 at the discretion of an individual.

It should be noted that the liner 16 preferably has sufficient durability to not tear, fail, or spill used litter 46 during the removal of a liner 16 for disposal.

Each of the side walls 14 preferably include an upper section 18 which may further include a lip or affixation member 20 which is preferably utilized to releasably couple the lid 22 to the base 12. The positioning of the lip or affixation member 20 proximate to the upper section 18 of the side walls 14 preferably eliminates a connecting edge being positioned proximate to an area of the feline litter box 10 adjacent to the litter 46. The elevation of the lip or affixation member 20 vertically with respect to the litter 46 facilitates the retention of cat waste or litter 46 within the interior of the litter box 10 thereby reducing spillage and mess onto a floor surface. It should be noted that the edges of the side walls 14 may be slightly sloped outwardly to facilitate use by a feline.

It should also be noted that the base 12 may be formed of any other material in addition to plastic as desired by an individual without sacrifice of the essential functions, features, and attributes described herein.

The lid 22 is preferably releasably coupled to the side walls 14 of the base 12. The lid 22 preferably includes a grasper 24 which is preferably adapted to be releasably coupled to the lip or affixation member 20 during use of the feline litter box 10. The lid 22 includes a top 21 where the lid 22 and top 21 are preferably substantially flat or horizontal for covering of the base 12. The top 21 and lid 22 are preferably positioned approximately ½" to ¾" above the lip 20 or seam of the side walls 14. The grasper 24 preferably includes an engagement edge 25 and a tab section 27. The engagement edge 25 is preferably adapted for positioning over the lip or affixation member 20 and the tab section 27 is preferably adapted for positioning below the lip or affixation member 20 during coupling of the lid 22 to the base 12. It should be noted that other types of fasteners may be utilized to couple the lid 22 to the base 12 at the preference of an individual.

The lid 22 is preferably formed of a top 21, a plurality of support sections 23, and the grasper 24. The support sections 23 preferably are of sufficient strength and durability to support the weight of a cat when standing upon the top 21 when the lid 22 is engaged to the base 12. The support sections 23 preferably provide for the transition between the upper section 18 of the base 12 and the top 21 of the lid 22.

The lid 22 is preferably formed of a material identical to the base 12. The lid 22 preferably snaps into coupling relationship to the lip or affixation member 20 as integral to the side walls 14 during use of the feline litter box 10. The lid 22 preferably snaps onto the upper section 18 of the side walls 14 similar to the affixation of a tote.

The lid 22 preferably includes an access opening 26 having an approximate diameter dimension of 9 inches. The access opening 26 may include a sloped or dished edge 28 which preferably facilitates in the retention of litter 46 within the interior of the feline litter box 10.

It should be noted that the lid 22 is preferably positioned to the exterior of the base 12 which further facilitates in the retention of waste and/or litter 46 within the interior of the feline litter box 10.

The top 21 preferably includes a paw-cleaning section or area 30. The paw-cleaning section or area 30 preferably includes a plurality of raised nubs, bristles, brushes, and/or tabs which are preferably utilized by a feline to remove litter 46 which may be held between the pads of the feline's paws following use of the feline litter box 10. Alternatively, the paw-cleaning section or area 30 may extend substantially over the entire upper surface of the top 21 at the preference of an individual.

Adjacent to the paw-cleaning section or area 30 is preferably positioned a filter opening 31. The filter opening 31 is preferably positioned opposite to the access opening 26. A filter 32 is preferably positioned adjacent to the filter opening 31. The filter 32 preferably includes a replaceable portion of odor-absorbing material 48 such as charcoal. The filter opening 31 and filter 32 provide for air flow communication between the base 12 through the lid 22 into the surrounding environment. The odor-absorbing material 48 preferably removes undesirable odors prior to circulation into an environment adjacent to the feline letter box 10.

Figure 2:
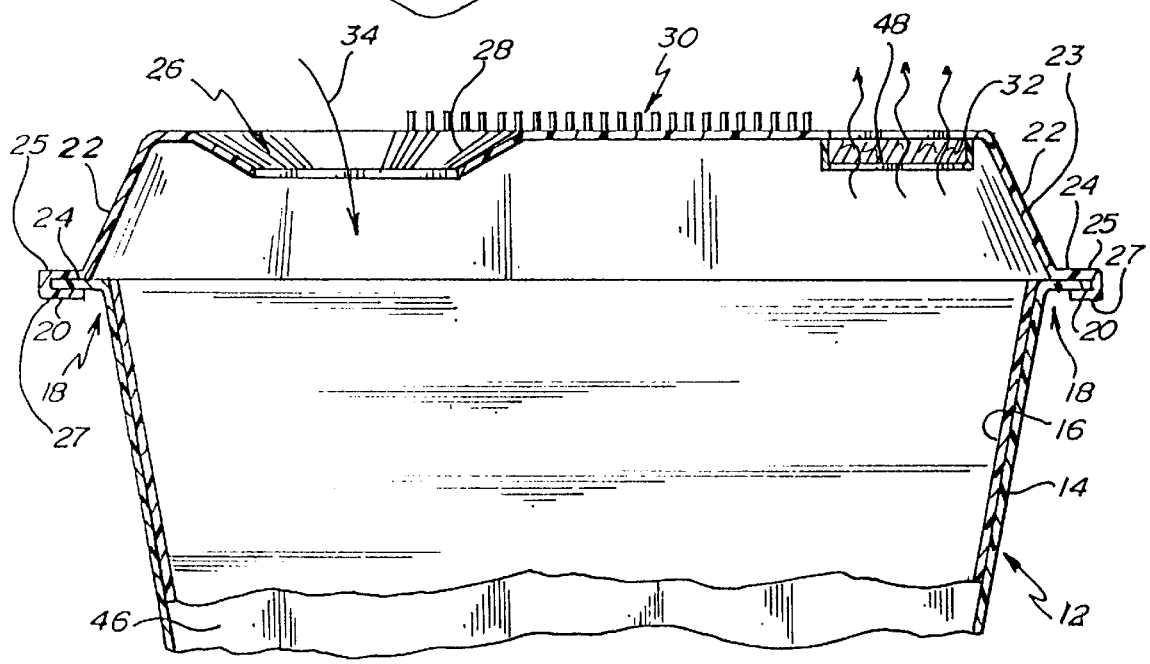
FIG. 2 is a cross-sectional side view of the feline litter box taken along the line 2—2 of FIG. 1.

As may be seen in FIG. 2, a feline may obtain access into the interior of the feline litter box 10 through the access opening 26 by following the direction of arrow 34. The internally sloped or dished edge 28 preferably facilitates in the retention of waste and/or litter within the interior of the base 12 during the use of the feline litter box 10.

Figure 4:
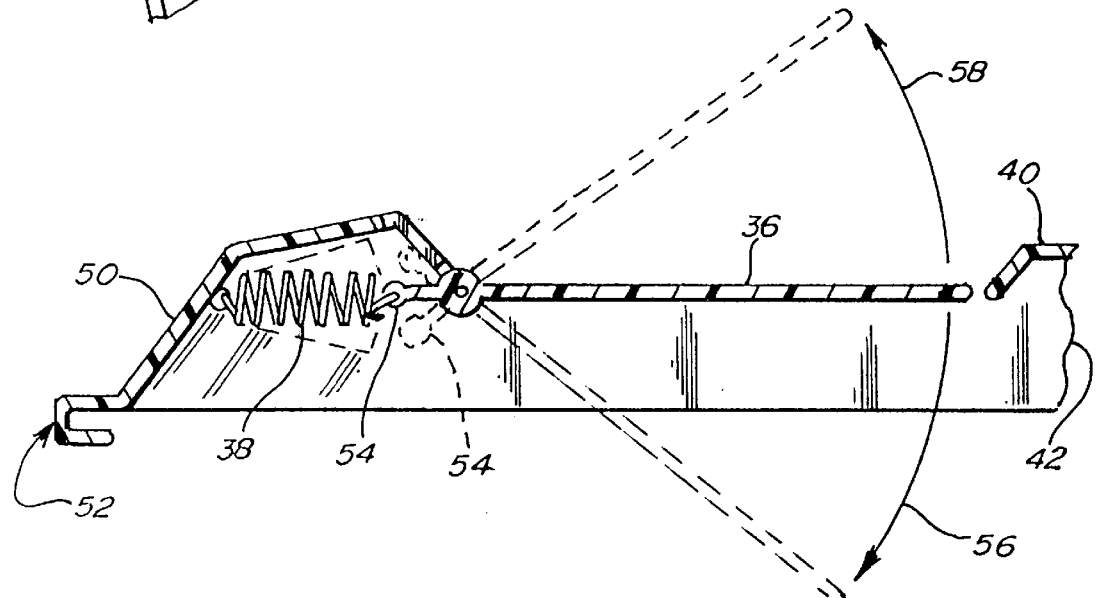
FIG. 4 is a detailed cross-sectional side view of the top entry door for the feline litter box.

In an alternative embodiment as depicted in FIG. 4 the access opening 26 may include a top entry door 36. The top entry door 36 may preferably be connected to a spring 38 which in turn is affixed to an extension frame 50. The extension frame 50 is preferably positioned opposite to the top entry door 36 and may include an engagement member 52. The engagement member 52 may be similar in construction to the grasper 24 of the lid 22. The engagement member 52 is preferably adapted for releasable affixation to the lip or affixation member 20. Alternatively, the engagement member 52 may be screws, bolts, rivets, hasps, clamps, and/or any other affixation device for attachment to the top 21 or lid 22 at the preference of an individual for positioning of the top entry door 36 in covering relationship with respect to the access opening 26.

The top entry door 36 preferably includes a catch section 40 which is preferably adapted for releasable engagement to a second lip 42 integral to the internally sloped or dished edge 28.

A cat, to obtain entry into the feline litter box 10, may place weight and downward force upon the top entry door 36. A spring engagement section 54 then preferably separates from and expands a coiled compression spring 38. Simultaneously, the catch section 40 separates from the second lip 42 downwardly in the direction as indicated by arrow 56 providing ingress into the interior of the feline litter box 10. Upon entry into the interior of the feline litter box 10 by a cat, the spring 38 preferably contracts drawing the spring engagement section 54 into the static position for positioning of the top entry door 36 in a substantially horizontal configuration with the catch section 40 in contact with the second lip 42. A feline, to obtain egress from the interior of the feline litter box 10, will preferably place force upwardly against the top entry door 36 to cause the spring engagement section 54 to expand the spring 36 and to separate the catch section 40 from the second lip 42 to elevate the top entry door 36 upwardly in the direction as depicted by arrow 58. A cat may thereby exit the feline litter box 10. Following the exit of a cat from the interior of the feline litter box 10, the spring 38 preferably contracts drawing the spring engagement section 54 toward the spring 38 and into a static position returning the top entry door 36 and catch section 40 into engagement with the second lip 42 for positioning of the top entry door 36 in covering relationship over the access opening 26.

The use of the top entry door 36 preferably assists in the retention of undesirable odors in the interior of the feline litter box 10. Air to pass to the exterior environment from the interior of the feline litter box 10 is thereby required to traverse the odor-absorbing material 48 of the filter 32. The reduction of undesirable odors proximate to the feline litter box 10 is thereby accomplished.

The coupling of the lid 22 to the side walls 14 preferably minimizes the leaking, spraying, or spillage of litter or fluid to the exterior of the base 12. Following use, a feline may exit the feline litter box 10 vertically through the access opening 26. A feline may then step upon the paw-cleaning section or area 30 whereupon the feline's paws will engage the nubbed, knurled, and/or brush surface in order to remove litter 46 which may have been retained as between the pads of the feline's foot. The paw-cleaning section or area 30 preferably functions to minimize spillage of litter material 46 onto a floor surface. It should be noted that the paw-cleaning section or area 30 may encircle the access opening 26 and substantially cover the exterior of the top 21 at the preference of an individual.

The filter 32 preferably reduces undesirable odors in the environment proximate to the feline litter box 10. The filter 32 is preferably replaceable and may be slidably engaged to the undersurface of the lid 22 through the use of elongate rails, tongues-and-grooves, and/or ledges.

Alternatively, the filter 32 may be releasably engaged to the undersurface of the lid 22 through the use brackets. It should be noted that the affixation mechanism selected for attachment of the filter 32 including the odor eliminating material 48 may vary widely at the discretion of an individual.

Following a period of use, an individual may unsnap the lid 22 from the lip or affixation member 20. An individual may then grasp the disposable liner 16 for disposal. A replacement liner 16 may then be positioned within the interior of the base 12 and releasably coupled to the upper section 18 of the side walls 14. An individual may then recouple the lid 22 to the side walls 14 for reuse of the feline litter box 10 by a cat.

An alternative embodiment of the feline litter box 10 is disclosed in FIGS. 5, 6, and 7. In this embodiment the top 21 of the lid 22 is preferably flat and in general includes an access opening 26 and a paw cleaning section 30. The paw cleaning section 30 is preferably formed of a plurality of nubs where each nub has an approximate height dimension of ½ inch (FIG. 5). As may be seen in FIG. 5, the lid 22 preferably includes a pair of upper handle sections 60 which are located on opposite ends of the lid 22. As may be seen in FIG. 7, the base 12 includes a pair of handles 62 which are positioned proximate to the upper sections 18 on two opposite side walls 14. The upper handle section 60 and handle 62 facilitate transportation and positioning of the feline litter box 10 in a desired location as preferred by an individual.

As may be seen in FIG. 7, the bottom 13 of the base 12 preferably includes a raised ridge 64 which is used to elevate the bottom 13 relative to a ground or floor surface. The raised ridge 64 preferably also functions to enhance the structural strength and durability of the bottom 13 of the base 12.

As may be seen in FIG. 6, the lid 22 has a thickness dimension approximating ¾ inch to 1 inch. The lid 22 is preferably flat and includes a fastening lip 66 which preferably extends around the circumference of the lid 22. Alternatively, the fastening lip 66 may be discontinuous and regularly spaced at any desired intervals around the circumference of the lid 22 as preferred by an individual. The access opening 26 preferably includes a support 68 which may have a height dimension approximating ½ inch. In addition, the underside of the lid 22 may include a plurality of radially extending support ribs 70 which function to enhance the structural strength and durability of the lid 22 during use of the feline litter box 10. Each of the radially extending support ribs preferably has a height dimension approximating ½ inch. The support ribs 70 preferably extend from the access opening 26 to a position proximate to the fastening lip 66 of the underside of the lid 22. It should be noted that the support ribs 70 may be preformed or prefabricated on the underside of the lid 22 or may be affixed thereto at the preference of an individual.

The underside of the lid 22 may also preferably include one or more clasps 72 which assist in the attachment of the lid 22 to the upper sections 18 of the elongate side walls 14 and/or base 12 at the preference of an individual. It should be noted that the fastening lips 66 are preferably adapted to couple to the upper sections 18 of the elongate side walls 14 during positioning of the lid 22 in covering relationship on the base 12 during use of the feline litter box 10. It should be further noted that the upper sections 18 of the side walls 14 may include a rolled edge which may be adapted for positioning and insertion into the fastening lip 66 at the preference of an individual.

As may be seen in FIG. 6, the lid 22 may also include a plurality of lip supports 74 which are positioned proximate to the fastening lip 66. The area between the lip supports 74 and the fastening lip 66 is defined as a channel 76. The channel 76 is preferably adapted for receiving engagement of the side walls 14 during coupling of the lid 22 to the base 12. The lip supports 74 may be intermittent and be positioned proximate to the corners of the lid 22. In addition, one or more lip supports 74 may be positioned about the periphery of the lid 22 to facilitate coupling engagement to the upper sections 18 of the side walls 14.

Referring to FIG. 5, the lid 22 may be sloped downwardly toward the access opening 26. The exterior portion 78 of the lid 22 may be approximately three or more inches higher than position 80 which is proximate to access opening 26. The sloping inwardly and downwardly of the surface of the lid 22 toward the access opening 26 facilitates in the retention of litter 46 in the interior of the feline litter box 10. A cat may clean its paws on the nubs 30 which likely results in the separation of cat litter 46. The separated cat litter 46 will then gravitate toward the access opening 26 and will preferably fall into the interior of the feline litter box 10. It should be noted that the entire exterior edge 78 of the circumference of the lid 22 may be elevated with respect to the access opening 26 to facilitate in the retention of cat litter 46 in the interior of the feline litter box 10.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

I claim:

1. A feline litter box comprising:
    a) a base having a bottom and a plurality of elongate side walls extending upwardly from said bottom defining an interior, said side walls having an upper section and a lip proximate to said upper section;
    b) a disposable liner releasably engaged to said upper section of said side walls, said liner being positioned within said interior of said base, said liner holding absorbent material; and
    c) a substantially horizontal lid releasably coupled to said lip, said lid having an access opening and a paw cleaning section, said lid adapted to be releasably coupled to said upper section of said side walls and to affix said liner within said interior of said base.

2. A feline litter box according to claim 1, said paw cleaning section comprising a plurality of brushes.

3. A feline litter box according to claim 1, said paw cleaning section comprising a plurality of nubs.

4. A feline litter box according to claim 2, said lid comprising a filter opening.

5. A feline litter box according to claim 4, said lid further comprising a grasper having an engagement edge wherein said engagement edge is positioned over said lip.

6. A feline litter box according to claim 5, said grasper further comprising a tab section for positioning below said lip.

7. A feline litter box according to claim 6, said lid comprising an underside.

8. A feline litter box according to claim 7, wherein said filter is engaged to said underside proximate to said filter opening within said interior.

9. A feline litter box according to claim 8, further comprising a plurality of liners wherein each liner has a perforated upper edge engaged to said interior of said side walls proximate to said lip.

10. A feline litter box according to claim 9, said access opening comprising a dish-shaped edge.

11. A feline litter box according to claim 10, further comprising a top entry door engaged to said lid proximate to said access opening wherein said top entry door covers said access opening.

12. A feline litter box according to claim 11, said top entry door comprising a spring engagement section and a catch section.

13. A feline litter box according to claim 12, said top entry door further comprising an extension frame and a spring, said spring being attached to said extension frame and to said spring engagement section whereby said top entry door swings into said interior or outwardly away from said interior to provide ingress into said interior or egress out of said interior by a cat.

14. A feline litter box according to claim 13, wherein said catch section is adapted to engage a second lip.

* * * * *